(No Model.)  3 Sheets—Sheet 1.

J. D. PATTERSON.
WHEEL PLOW.

No. 264,562.  Patented Sept. 19, 1882.

WITNESSES:  INVENTOR:
J. D. Patterson
BY
ATTORNEYS.

(No Model.) 3 Sheets—Sheet 2.

J. D. PATTERSON.
WHEEL PLOW.

No. 264,562. Patented Sept. 19, 1882.

WITNESSES:
Chas. Heinicke
C. Sedgwick

INVENTOR:
J. D. Patterson
BY Munn & Co.
ATTORNEYS.

(No Model.)　　　　　J. D. PATTERSON.　　　3 Sheets—Sheet 3.
WHEEL PLOW.

No. 264,562.　　　　　　　　Patented Sept. 19, 1882.

WITNESSES:　　　　　　　　　　　INVENTOR:
Chas. Rheineke　　　　　　　　　J. D. Patterson
C. Sedgwick　　　　　　　　　BY Munn & Co.
　　　　　　　　　　　　　　　ATTORNEYS.

UNITED STATES PATENT OFFICE.

JAMES D. PATTERSON, OF COMPETITION, MISSOURI.

WHEEL-PLOW.

SPECIFICATION forming part of Letters Patent No. 264,562, dated September 19, 1882.

Application filed April 1, 1882. (No model.)

*To all whom it may concern:*

Be it known that I, JAMES D. PATTERSON, of Competition, in the county of Laclede and State of Missouri, have invented a new and Improved Wheel Gang-Plow, of which the following is a full, clear, and exact description.

My invention relates to improvements in that class of wheel-plows in which the plows are alternately drawn forward by the truck; and it consists in the peculiar construction and arrangement of parts, as hereinafter fully set forth.

Reference is to be had to the accompanying drawings, forming part of this specification, in which similar letters of reference indicate corresponding parts in all the figures.

Figure 1:
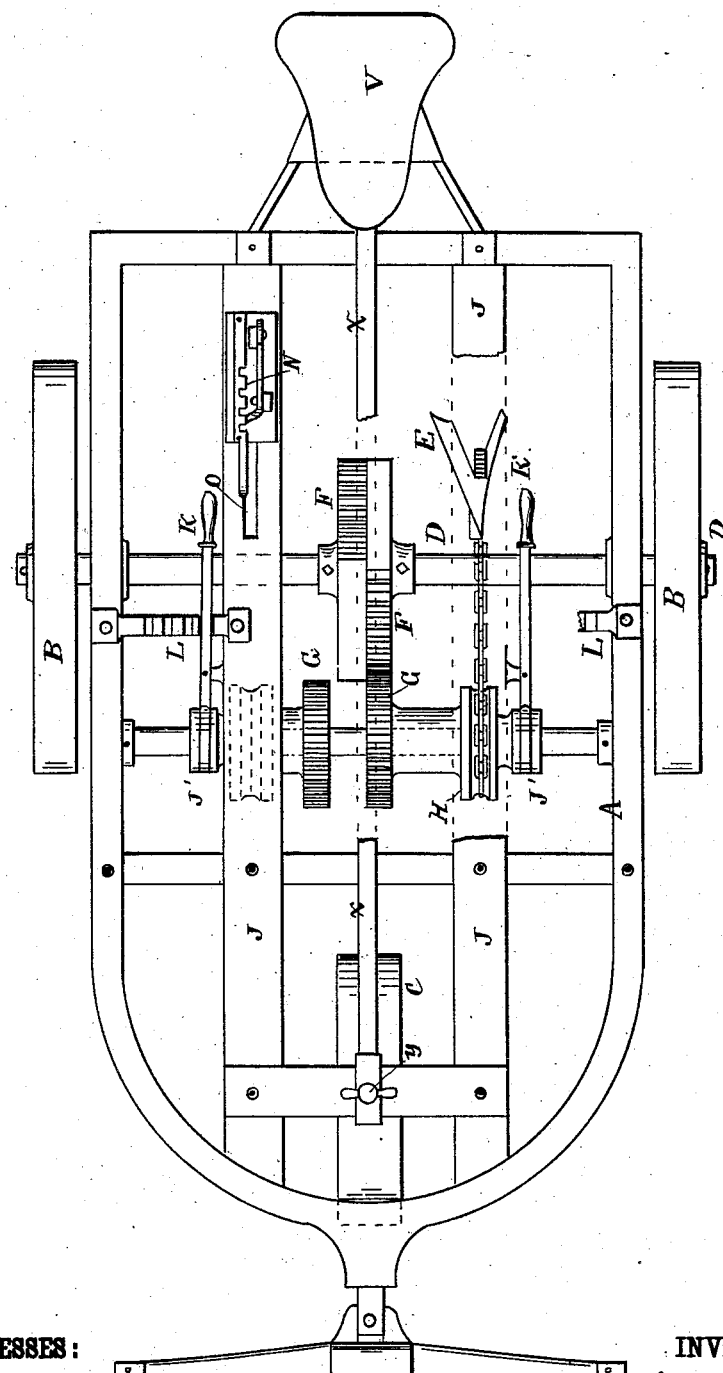
Figure 2:
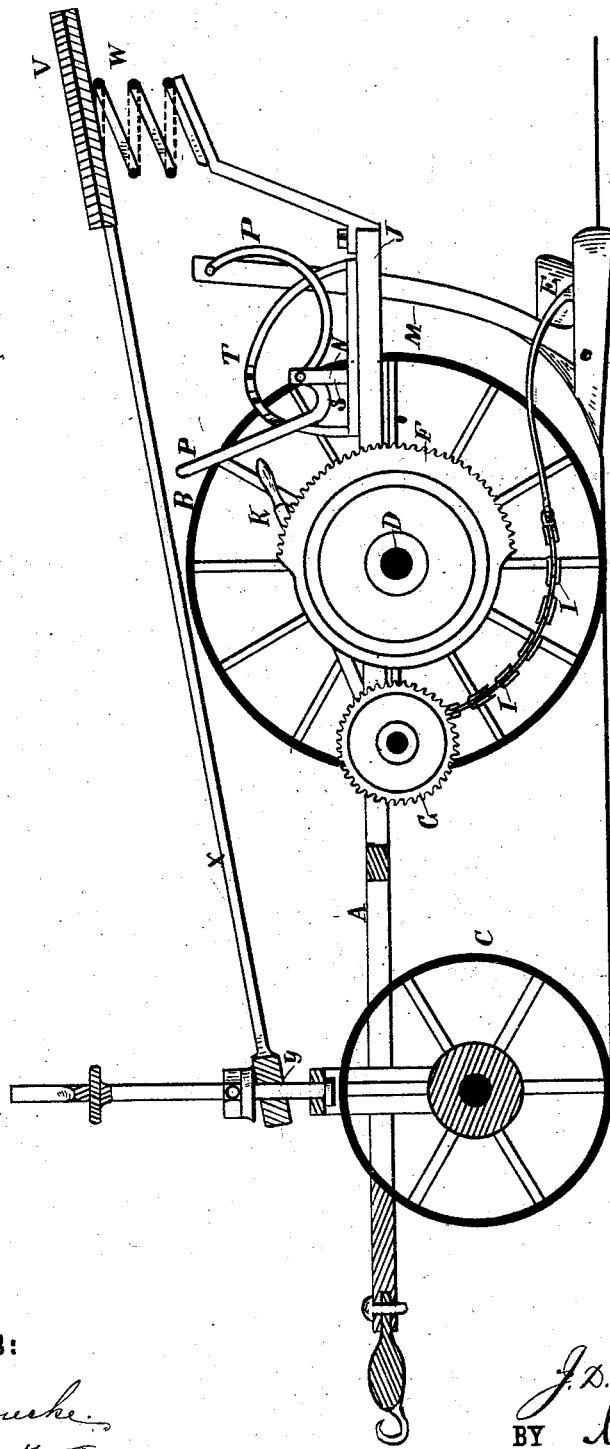
Figure 3:
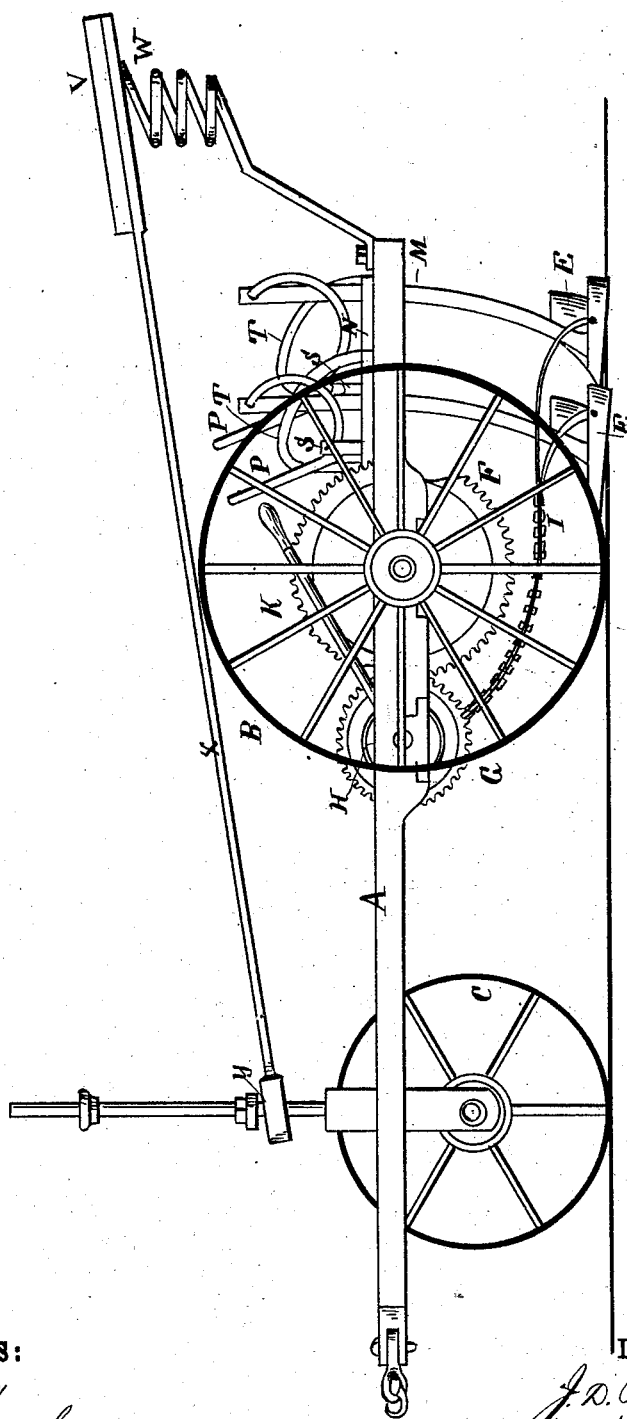

Figure 1 is a plan view of my improved plowing-machine. Fig. 2 is a longitudinal sectional elevation, and Fig. 3 is a side elevation.

A represents the frame of the truck, which is mounted on the two hind wheels, B, and front wheel, C, the hind wheels being keyed fast to the axle D for the purpose of rotating it to apply the power to the plows E by means of the cog-wheels F, pinions G, drums H, and chains I, the plows being fitted upon the bars J to slide forward on them and rest till overtaken by the truck, and the wheels F being toothed only half their circumference, so as to work the drums intermittently, the said wheels being set with their toothed faces opposite to each other, so that one plow is advanced while the other rests.

J' represents clutches with levers K and rack-bars L for disconnecting the drums from the pinions in case it may be required, when the plows will be drawn in the usual manner by the truck.

The plow-standards M are mounted on the bars J by means of sliding plates N, which facilitate the reciprocating motion, while at the same time, together with the slots O, they maintain the plows in the working position—that is to say, they keep the plows upright and properly guided. For vertically shifting the plows the standards are fitted so as to rise and fall in the slotted bars J and through the guide-plates N thereon, and a hooked-shaped hand-lever, P, is pivoted to a post, S, on the guide-plate N for lifting them. The posts for the lifting-levers are attached to the guide-plates so as to move along with the plows on the frame, and a rack-bar, T, is attached for securing the levers.

V represents the driver's seat, mounted at the rear end of the truck on a spring, W, conveniently for reaching the levers P, and having a rod, X, extending forward to the stem of the front wheel-frame for a stay to the spring.

Having thus fully described my invention, I claim as new and desire to secure by Letters Patent—

1. The combination, with plows fitted to slide in ways of the truck-frame, of the mutilated gear-wheels F, having their toothed faces set opposite to each other, the pinion G, the drums H, and the chains I, substantially as and for the purpose set forth.

2. The combination, with the slotted longitudinal bars J, the plows E, and plow-standards M, of the mutilated gear-wheels F, the pinions G, the drums H, and chains I, substantially as and for the purpose set forth.

3. The combination, with the slotted bars J, the plow-standards M, and means for moving the said standards forward, of the sliding guide-plates N, the bent lever P, and the rack T, located on said guide-plates, substantially as and for the purpose set forth.

4. The combination, with the plows E, the axle D, and the mutilated gear-wheels T, of the pinions G, the drums H, the chains I, the clutches J, and levers K, substantially as and for the purpose set forth.

JAMES D. PATTERSON.

Witnesses:
C. W. RUBEY,
WM. P. BOWMAN.